United States Patent [19]

Ness

[11] 4,067,609
[45] Jan. 10, 1978

[54] HEADREST COVER FASTENING DEVICE

[75] Inventor: Irving Stanley Ness, Princeton Borough, N.J.

[73] Assignee: Johnson & Johnson, New Brunswick, N.J.

[21] Appl. No.: 743,812

[22] Filed: Nov. 22, 1976

Related U.S. Application Data

[63] Continuation of Ser. No. 608,364, Aug. 27, 1975, abandoned.

[51] Int. Cl.$^2$ .......................... B62J 1/10; A44B 17/00
[52] U.S. Cl. .............................. 297/220; 297/DIG. 6; 24/204
[58] Field of Search ..................... 24/DIG. 18, 204, 7, 24/72.5; 297/220, DIG. 6, 219, 223, 227; 15/209 R; 224/42.46 B, 5 R; 2/DIG. 6; 40/129 A; 116/173

[56] References Cited

U.S. PATENT DOCUMENTS

| | | |
|---|---|---|
| 3,113,803 | 12/1963 | Struble ............................. 2/DIG. 6 |
| 3,143,154 | 8/1964 | Best ......................................... 24/204 |
| 3,256,882 | 6/1966 | Huber .................... 24/204 |
| 3,266,841 | 8/1966 | Altman ............... 297/220 |
| 3,318,632 | 5/1967 | Struble ............... 297/220 |
| 3,490,449 | 1/1970 | Ewerwahn ............................. 24/204 |
| 3,512,225 | 5/1970 | Halstead ................................. 24/204 |
| 3,654,059 | 4/1972 | Zisblatt ..................... 24/204 |
| 3,708,837 | 1/1973 | Chiba .................................... 24/204 |
| 3,835,508 | 9/1974 | Bini ....................................... 24/204 |
| 3,853,226 | 12/1974 | Hine ...................................... 24/204 |

Primary Examiner—Bernard A. Gelak
Attorney, Agent, or Firm—Charles J. Metz; Richard J. Rodrick

[57] ABSTRACT

An improved attaching means for affixing a headrest cover to a mounted fastener on seat backs. The improvement comprises an attachment strip having two portions: a first portion which is secured to the headrest cover, and a second portion which extends from the attachment made by the first portion. The second portion of the attachment strip is flexible and has a plurality of openings sufficient to engage the upstanding hook-like elements of the mounted fastener.

9 Claims, 5 Drawing Figures

HEADREST COVER FASTENING DEVICE

This is a continuation of application Ser. No. 608,364, filed Aug. 27, 1975, now abandoned.

This invention relates to means for fastening headrest covers to the back of a seat. More particularly, this invention relates to an improved fastening means for replaceable type headrest covers which are used in or on transportation carriers.

Replaceable headrest covers find use in many different fields, notably in the transportation industries. These headrest covers are fastened or draped over the seat backs in buses, trains, airplanes and the like, and provide both protection to the seat back upholstery and a sanitary feature for the occupier of the seat. It is common to remove the headrest covers on frequent occasions and replace them with fresh, clean covers for the next passengers.

Depending upon the fastening means employed to attach the headrest cover to the seat back a number of problems exist. One of the more common fastening means to attach covers to seat backs is the "VELCRO" type. The "VELCRO" fastener is permanently affixed to the seat back and has a number of hook-like pile elements. Presently used and available headrest covers, with holes therethrough, or with a strip of nonwoven fabric with raised pile portions, or with an elongated thread with loosely formed loop portions, are pressed against the hook-like elements to allow the fibers of the headrest cover itself or the strip material to become caught by the hooks. When these covers are removed for replacement many of the fibers and/or threads from the attachment area remain entangled on the hooks of the fastener. Accumulation of these threads after much use necessitates periodic cleaning operations, which take time and effort.

I have now discovered a device for fastening headrest covers to seat backs which overcomes this problem. My improved fastening device eliminates the need to clean threads and textile fibers from the hook-like elements of the fastening strip, thereby providing beneficial labor and effort savings.

My new fastening device is used on headrest covers which are intended to be removably connected to a fastener mounted on a seat back, especially those fasteners containing hook-like elements. The fastening device is an improved attaching means comprising a strip of material having a first portion secured to the cover or towel and having a second portion extending from the attachment made by the first portion. The second portion of the attachment strip is flexible and has a pattern of discontinuous openings sufficient to engage the hook-like elements of the fastener.

It is preferred that the attachment strip be a plastic material. When the strip is made of plastic it is also desirable to have the second or extending portion of the strip in the form of a network structure. This network comprises filaments of plastic material intersecting with each other at regular intervals while defining a pattern of openings in the strip, the openings of adequate size to become hooked on the pile elements of the fastener.

Use of the plastic netting material to engage the hook-like elements of "VELCRO" fasteners permits a clean removal when the headrest cover is replaced. There are no loose fiber strands to be caught in the hooks due to the smooth, flexible plastic filamentary sections in a network structure.

These advantages and other features of the invention will be more easily perceived and more fully described in conjunction with the following drawings wherein.

Figure 1:
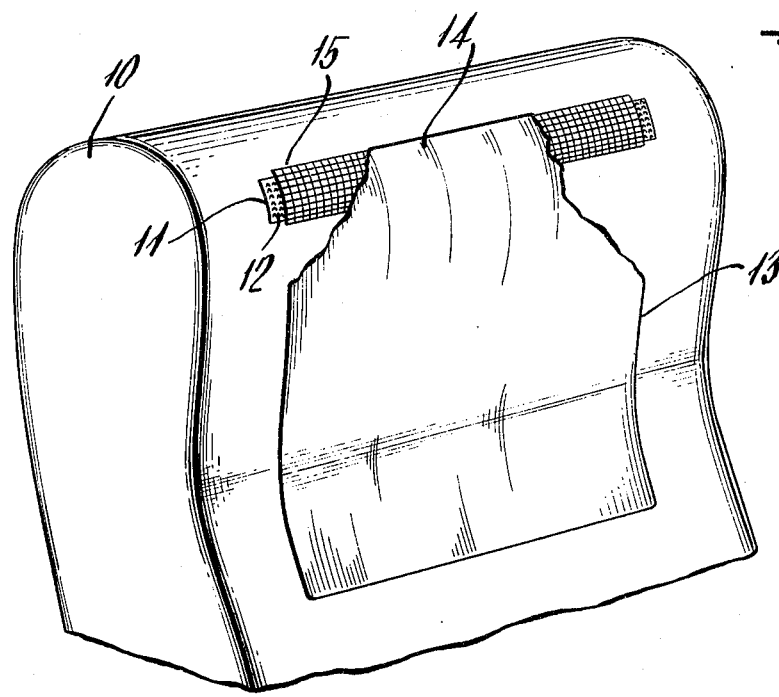
FIG. 1 is a perspective cutaway view of the top section of a seat back showing a headrest cover fastened with the improved attaching device.

Referring to the drawings there is shown in FIG. 1 a typical seat back 10 that is commonly found in vehicles of transportation. Permanently mounted on the seat back 10, in this instance, in the vicinity of the headrest area, is a "VELCRO" type fastening strip 11. The "VELCRO" strip has a plurality of hook-like elements 12 projecting outwardly from the mounting area, the hook-like elements 12 uniformly distributed throughout the strip. Although the "VELCRO" type fastening strip is specifically described as being compatible with the present invention, it should be understood that the invention is not limited to "VELCRO" types, but other fastening strips, especially those having hook-like elements, as well.

Affixed to the fastening strip 11 is a replaceable headrest cover 13. The headrest cover includes at least two components, a cover sheet or towel 14, and a means 15 for attaching the towel 14 to the fastening strip 11 mounted to the seat back 10. The towel 14 is a strong, flexible material, yet lightweight and inexpensive; it may be made of woven or nonwoven materials, paper and the like, an is allowed to drape over the headrest portion of the seat back 10 to afford both protection to the seat back upholstery and sanitary cleanliness to the occupier of the seat. The towel 14 is fixed to the seat back 10 through the attaching means 15 which is adjoined to the hook-like elements 12 of the fastening strip 11.

Figure 2:
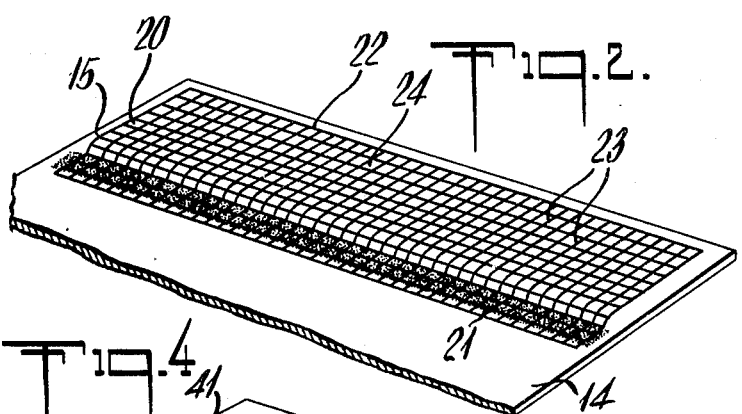
FIG. 2 is a perspective view of the portion of the headrest cover with the attachment strip material secured in position.

The novel attaching means 15 is further depicted in FIG. 2. The attaching means 15 is an attachment strip 20 having two portions. In the embodiment being described the attachment strip 20 is made of plastic, but other materials such as textiles may be used if desired. A first portion 21 of the attachment strip 20 is secured to the towel 14. The attachment strip 20 is secured to the towel 14 in this embodiment so that the entire strip lies within the plane of the towel, i.e., there is no extension of any part of the attachment strip over the edge of the towel. In this respect the attaching means remains hidden behind the towel during use. Typical and feasible methods of securing the attachment strip material 21 to the towel are stitching, taping, gluing, applying hot melt, and heat sealing the edges of the strip if the strip has thermoplastic properties. Any other method of securing the first portion 21 of the strip to the towel to make a strong, effective seal may also be used.

The second portion 22 of the strip 20 is a material with a pattern of discontinuous openings 24 which extends from the attachment made to the towel 14 by the first portion 21 of the attachment strip. The extending or second portion 22 possesses pliability and flexibility and freely extends from the towel 14. Structurally, the preferred embodiment of the second portion 22 is a plastic netting. This plastic netting is a reticulated sheet having a network of intersecting filaments 23 defining a pattern of discontinuous openings 24. The netting may be prepared by weaving filaments 23 of a synthetic polymer in a loosely woven scrim-type framework, with the intersecting filaments in a criss-cross, over-under relationship. Other nettings which find use in this invention are the reticulated plastics described in U.S. Pat. No. 3,666,609 and in pending patent application Ser. No. 54,942 filed July 15, 1970. These plastic products are flat, planar, sheet-like synthetic polymers with a plurality of openings formed by molecularly oriented filaments which are integrally joined at the intersections. Many different plastic nettings including, but not limited to, those described in U.S. Pat. Nos. 3,441,638 and 3,137,746 also may be desirably used with the same beneficial results. The materials preferably used in the plastic netting of this invention are the polyolefins, more particularly, polypropylene and polyethylene.

Although the size and dimensional characteristics of the extending second portion of the plastic netting 22 are not critical, the best results of performance and economics are achieved when the length of the extending netting is approximately the size of the target area of the mounted "VELCRO" fastener.

Figure 3:
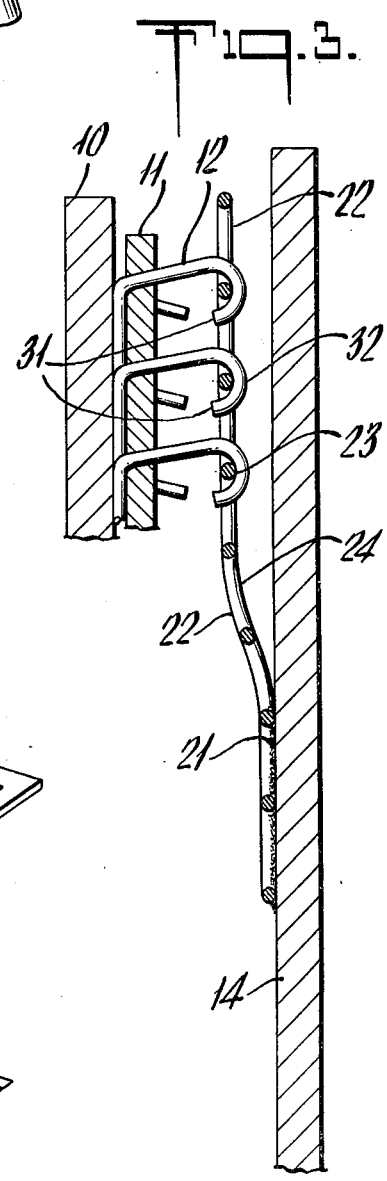
FIG. 3 is an enlarged cross-sectional view showing the engagement of the attachment strip to the fastener.

Utilization of the novel attaching means of the present invention is illustrated in the enlarged cross-sectional view of FIG. 3. The "VELCRO" fastening strip 11 is mounted to the seat back 10 so that the hook-like elements 12 project outwardly. Engaged on the hook-like elements 12 is the netting portion 22 of the plastic strip while the first portion 21 of the plastic strip is secured to the towel 14. In actual use the towel 14 is folded back and the netting portion 22 is pressed by thumb pressure, hand tool, or any other device against the hook-like elements 12 of the mounted fastener. Being flexible, both the hook-like elements 12 of the mounted fastener and the filaments 23 of the plastic netting are forced in various directions until the hooks 31 catch and lock onto the filaments 23. It should be kept in mind that the hooks 31 of the hook-like elements 12 are positioned in random directions within the "VELCRO" fastener and engage the filaments 23 running in transverse and longitudinal directions or other directions if the netting is not orthogonal. Once the filaments 23 are engaged by the hooks 31, the netting 22 is secured to the fastener 11 and the towel 14 is allowed to drape on the seat back.

In selecting the plastic netting as the extending portion 22 of plastic material it is critical that the size of the openings and filaments be compatible with the "VELCRO" hook-like elements 12. As seen in FIG. 3, the openings 24 between filaments 23 must be sufficient in size to fit over the curved portion 32 of the hook-like elements 12. Once over the curved portion of hook-like elements the filaments 23 must be able to be caught by the hooks 31. Needless to say, if the size of the filaments 23 is too large they cannot be engaged by the hooks 31; if too small, the filaments will not be strong enough to hold the towel and perform satisfactorily. In a typical application with a "VELCRO" fastener, opening sizes in the plastic netting greater than 0.006 square inches (0.0387 sq. cm.) and filament sizes between 0.003 inches (0.00762 cm.) and 0.013 inches (0.0330 cm.) thick perform quite satisfactorily.

When the attached headrest cover is to be replaced the secured netting portion 22 is pulled away from the mounted fastener. Again, the flexibility of the hook-like elements 12 and the plastic filaments 23 allows the filaments 23 to slip out of engagement with the hooks 31, thereby becoming free. The result is a clean breakaway, leaving the fastener in proper condition to accept a fresh headrest cover replacement.

Figure 4:
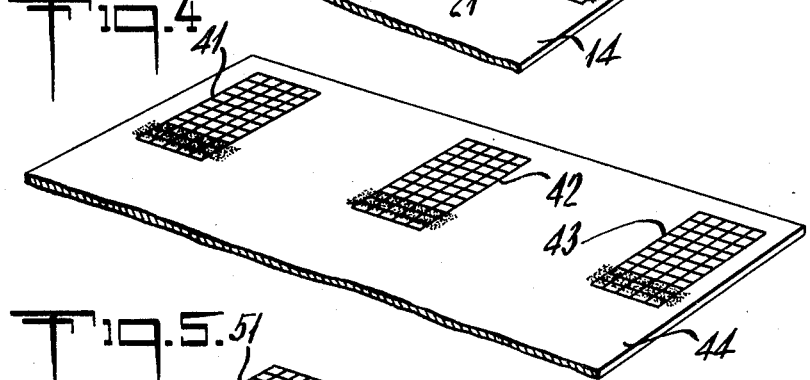
FIG. 4 is a perspective view of the portion of the headrest cover with another embodiment of attachment strips.

It is not essential that the novel attachment means extend as a unitary structure across the entire width of the headrest cover towel. For instance, a number of smaller attachment strips, spaced at desirable intervals, may be employed to fasten the cover towel to the seat back. One arrangement of smaller attachment strips is depicted in FIG. 4. In that embodiment three attachment strips 41, 42 and 43 are shown attached to the towel 44. The attachment strips 41, 42 and 43 in this embodiment have the same structure and perform substantially equivalently to the attachment strip previously described in conjunction with FIGS. 1-3.

Figure 5:
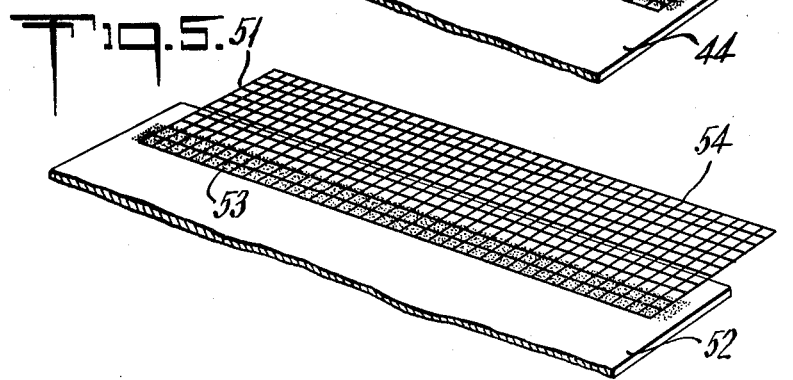
FIG. 5 is another embodiment of the present invention showing the second portion of the attachment strip extending beyond the edge of the towel.

It is also not essential that the improved attachment strip be hidden behind the towel during use. For instance, the attachment strip 51 in FIG. 5 is shown attached to the towel 52 such that the first portion 53 of the attachment strip is secured to an edge of the towel 52. The second portion 54 of the attachment strip extends beyond the edge of the towel 52, and is readily accessible to be affixed to the fastener without having to fold back the towel. There may also be a plurality of attachment strips with a portion extending over the edge of the towel, if desired.

It will be understood by those skilled in the art that variations and modifications of the specific embodiments described above can be made without departing from the spirit and scope of the invention as defined in the appended claims.

What is claimed is:

1. In a headrest cover of the type for removable connection to a fastener containing hook-like elements mounted on a seat back, said cover having towel and separate means to attach the towel to said mounted fastener, the improved attaching means comprising: a flat planar plastic attachment strip having a first portion secured to a surface of said towel and having a second portion freely extending from the attachment made by the first portion, said second portion comprising a flat planar flexible plastic material having a network of filaments defining a pattern of discontinuous opening sufficient to engage said hook-like elements of the fastener.

2. An improved attaching means as defined in claim 1 wherein the network structure of the second portion is a flat, planar, sheet-like synthetic polymer having a plurality of openings formed by filaments which are integrally joined at the intersections.

3. An improved attaching means as defined in claim 1 wherein the first portion of said attachment strip is secured to one edge of said towel and the second portion extends beyond the edge of said towel.

4. An improved attaching means as defined in claim 3 wherein there is a plurality of attachment strips.

5. An improved attaching means as defined in claim 1 wherein the plastic material is polypropylene.

6. An improved attaching means as defined in claim 1 wherein the plastic material is polyethylene.

7. An improved attaching means as defined in claim 1 wherein there is a plurality of attachment strips.

8. An improved attaching means as defined in claim 1 wherein said attachment strip extends as a unitary structure across the width of said towel.

9. In combination, a fastener containing hook-like elements mounted on a seat back, and a headrest cover removably connected to said fastener, said headrest cover comprising a towel and separate means to attach said towel to said mounted fastener, said attachment means consisting of a flat planar plastic attachment strip having a first portion secured to a surface of said towel and having a second portion freely extending from the attachment made by the first portion, said second portion being a flat planar flexible plastic material having a network of filaments defining a pattern of openings sufficient to engage said hook-like elements of the fastener.

* * * * *